(12) United States Patent
Shahar et al.

(10) Patent No.: US 8,619,804 B2
(45) Date of Patent: Dec. 31, 2013

(54) SYSTEM AND METHOD FOR THE DELIVERY OF HIGH SPEED DATA SERVICES OVER DEDICATED AND NON-DEDICATED PRIVATE LAND MOBILE RADIO (PLMR) CHANNELS USING COGNITIVE RADIO TECHNOLOGY

(75) Inventors: Menashe Shahar, Los Altos, CA (US); Stewart Kantor, Redwood City, CA (US)

(73) Assignee: Full Spectrum Inc., Menlo Park, CA (US)

( * ) Notice: Subject to any disclaimer, the term of this patent is extended or adjusted under 35 U.S.C. 154(b) by 446 days.

(21) Appl. No.: 12/745,914

(22) PCT Filed: Jun. 17, 2008

(86) PCT No.: PCT/IL2008/000823
§ 371 (c)(1),
(2), (4) Date: Aug. 18, 2010

(87) PCT Pub. No.: WO2009/078005
PCT Pub. Date: Jun. 25, 2009

(65) Prior Publication Data
US 2010/0303033 A1 Dec. 2, 2010

Related U.S. Application Data

(60) Provisional application No. 61/013,793, filed on Dec. 14, 2007.

(51) Int. Cl.
*H04L 12/413* (2006.01)

(52) U.S. Cl.
USPC .......................................... 370/445; 370/329

(58) Field of Classification Search
USPC ......................................... 370/445, 910, 329
See application file for complete search history.

(56) References Cited

U.S. PATENT DOCUMENTS

| | | | |
|---|---|---|---|
| 5,150,362 A | 9/1992 | Akerberg | |
| 5,636,243 A | 6/1997 | Tanaka | |
| 6,134,446 A * | 10/2000 | Sasuta et al. | 455/456.5 |
| 6,735,423 B1 | 5/2004 | Uskali et al. | |
| 2002/0045423 A1* | 4/2002 | Sashihara et al. | 455/11.1 |
| 2006/0250940 A1* | 11/2006 | Tirkkonen et al. | 370/208 |
| 2007/0147322 A1* | 6/2007 | Agrawal et al. | 370/338 |
| 2010/0022264 A1* | 1/2010 | Kwon et al. | 455/509 |
| 2011/0279736 A1* | 11/2011 | Tang et al. | 348/731 |
| 2011/0312368 A1* | 12/2011 | Hamdi et al. | 455/522 |

\* cited by examiner

*Primary Examiner* — Omer Mian
(74) *Attorney, Agent, or Firm* — Henry M. Sinai; IP-Partnership

(57) ABSTRACT

A system and method for delivery of high speed data services over dedicated and non-dedicated private land mobile radio (PLMR) channels using cognitive radio technology. The PLMR system provides bi-directional Point-to-Multipoint (PtMP) data communication between a dispatch center and many fixed or mobile remote terminals. A plurality of base stations communicate with a base station controller at the dispatch center and a plurality of remote radios communicate with at least one of the remote terminals. PLMR channel scanners, located in each base station and remote radio, scan the PLMR channels to determine which of the PLMR channels is idle at any point of time so that data communication may take place.

19 Claims, 7 Drawing Sheets

SYSTEM AND METHOD FOR THE DELIVERY OF HIGH SPEED DATA SERVICES OVER DEDICATED AND NON-DEDICATED PRIVATE LAND MOBILE RADIO (PLMR) CHANNELS USING COGNITIVE RADIO TECHNOLOGY

CROSS-REFERENCE TO RELATED APPLICATIONS

This application is a U.S. National Phase Application under 35 U.S.C. 371 of PCT International Application No. PCT/IL2008/000823, which has an international filing date of Jun. 17, 2008, and which claims priority from U.S. Provisional Patent Application No. 61/013,793, filed Dec. 14, 2007, all of which are incorporated herein by reference in their entirety.

FIELD OF THE INVENTION

The present invention relates to the delivery of high speed data services in general and to the use of dedicated and non-dedicated private land mobile radio (PLMR) channels for the delivery of data services.

BACKGROUND OF THE INVENTION

A Private Land Mobile Radio (PLMR) system is a Push to Talk (PTT) Point to Multipoint (PtMP) wireless communication system operating below 1 GHz. PLMR systems are primarily used for voice communication between groups of users. Only one user of the group can talk at any one time by pressing the button (i.e., activating PTT) while the rest of the users in the group are listening.

PLMR networks have evolved as voice centric systems making it difficult to support emerging mission critical data applications, such as remote data base access, for example. PLMR systems have several drawbacks, as follows:

Firstly, communication in PLMR systems is generally over narrowband PLMR channels. A PLMR channel width of 25 KHz has been typically used, but FCC regulations have mandated the narrow banding of certain frequencies, reducing channel sizes from 25 KHz to 12.5 KHz in order to double the number of available PLMR channels. The FCC is considering a further decrease in PLMR channel width to 6.25 KHz. As a result, while PLMR channels can support excellent voice quality, data communication is very slow.

Secondly, most PLMR systems are circuit switched systems. As such, they are not efficient for data communication. Research with real customer data reveals that channel voice occupancy is typically very low.

Several solutions have been proposed for PLMR systems to deliver data services, as follows:

Public wireless networks: These networks typically lack coverage across the PLMR user's serving area. Also, with their commitment to serve the general public, these systems are not considered mission critical by the PLMR users.

Dedicated data networks operating in unlicensed bands (900 MHz, 2.4 GHz or 5.8 GHz). Because of transmit power restrictions in the unlicensed bands as well as the higher frequency (relative to the PLMR operating frequencies); the coverage of these systems is relatively poor. Coverage can be improved with a costly dense node deployment. In addition, these systems are not considered robust enough for mission critical applications and are limited in their support of mobility.

Dedicated data networks operating in a licensed band (e.g. 700 MHz): Though this solution supports mission critical high speed data, it is very costly since the operator needs to pay for both the licensed frequencies and the new infrastructure.

Prior art solutions include U.S. Pat. No. 5,491,837 to Haartsen, which describes a method and system for channel allocation using power control and mobile-assisted handover measurements. US Patent Application No: 20070072554 to Janky describes a system and method for automatic roaming for conventional land mobile radios (LMR). U.S. Pat. No. 5,157,709 to Ohteru describes a Radio communications system adaptively assigning channels using power levels of idle channels. U.S. Pat. No. 4,144,496 to Cunningham describes a Mobile communication system and method employing frequency reuse within a geographical service area. U.S. Pat. No. 6,611,536 to Ahmed describes a System and method for integrating voice and data on a single RF channel.

None of the prior art documents describe the feature of a base station maintaining a two-way data communication with mobile remote radios in its service area over idle PLMR channels.

There is thus a need to provide an innovative wireless system and a method to implement a mission critical high speed data solution with similar coverage to the existing voice service, which overcome the disadvantages of present systems.

SUMMARY OF THE PRESENT INVENTION

The present invention presents a low cost solution for the delivery of high speed data services using non-dedicated private land mobile radio (PLMR) channels. The present invention supports integration with the existing PLMR systems and allows smooth migration to the next generation of PLMR systems.

In an embodiment of the present invention, the PLMR system provides bi-directional Point-to-Multipoint (PtMP) data communication between a Dispatch Center and many fixed or mobile Remote Terminals (RTs). Communication may take place over one or more PLMR channels.

The PLMR system may consist of a single Base Station Controller (BSC) typically located at the dispatch center, multiple Base Stations (BSs) located at the PLMR tower sites and fixed or mobile Remote Radios (RRs).

In an embodiment of the present invention, a PLMR channel may have any or all of the following characteristics:

1. It may operate in one of the frequency bands allocated to PLMR by the FCC (or any national spectrum regulation agency outside the US) and conform to the applicable regulations, such as FCC part 90 in the US, for example.
2. The channel width may be 50 KHz, 25 KHz, 12.5 KHz, 6.25 KHz or any other channel width as per the applicable national regulations.
3. A PLMR channel may be a single channel (with any of the above channel widths) used for simplex operation or it may consist of two sub-channels separated by a guard band (both with one of the above channel widths) used for radio relay operation.

The system may deliver broadband data services by employing multiple PLMR channels having the characteristics described hereinabove. These PLMR channels may be either:

1. Dedicated PLMR channels, that is PLMR channels that are dedicated to the broadband data service; or
2. Non-dedicated PLMR channels, that is, PLMR channels that are available for both circuit switched voice and broadband data services to support a data overlay solution. A non-dedicated PLMR channel is used by the system according to a policy defined by the user for this channel. A different policy may be defined for each non dedicated PLMR channel. For example, the user may decide that in a certain non-dedicated PLMR channel, voice always takes priority over data. In this case, this channel will be used for data, only when it is idle, that is, when there is no voice traffic.

The term "PLMR channel" is used hereinafter to refer to both dedicated and non-dedicated PLMR channels.

In one embodiment of the invention, the system employs the existing PLMR tower, backhaul and radio relay infrastructure to maintain coverage across the serving area (same as voice). In this case, communication between Base Stations and Remote Radios occurs with the assistance of the existing radio relays. In another embodiment of the invention, the Base Stations may use their own RF front end.

Cognitive (or sensing based) radio technology may be used by the system to detect idle non-dedicated PLMR channels and allocate them for data communication. The sensing mechanism is unlikely to be used for dedicated PLMR channels.

Examples of sensing schemes that may be applied to identify idle non-dedicated PLMR channels include:
 a. In one embodiment of the invention, each Remote Radio in the system has an embedded scanner that detects idle non-dedicated PLMR channel and transmits an idle channel report to its home Base Station (that is, to the base station controlling its current serving area) over a common control channel.
 b. In another embodiment of the invention, scanners are embedded at the Base Stations.
 c. Yet in another embodiment of the invention, stand alone devices are used to detect idle non-dedicated PLMR channels across the serving area. These devices have a scanner and have the capability to communicate with the Base Station.
 d. In another embodiment of the invention, scanners compare the power level at each non-dedicated PLMR channel against a threshold level to determine if the channel is idle.
 e. In a different embodiment of the invention (typically used with conventional PLMR radio systems), Continuous Tone Coded Squelch System (CTCSS) or Digital Code Squelch (DCS) signals may be used for detection of non-dedicated idle channels.
 f. In yet another embodiment of the invention (typically used with trunked radio systems), the trunked radio control channel is monitored to determine non-dedicated PLMR channel occupancy.

Non-dedicated idle PLMR channels may be used for a limited period of time (the "data transmission phase") and then released for a period of time (the "channel monitoring phase") in which voice users can regain access to the non-dedicated channel. If no traffic is detected during the monitoring phase, the non-dedicated channel is employed again for data transmission. For example, the data transmission phase may be limited to a period of 1 second followed by a channel monitoring phase of 500 ms.

In an embodiment of the invention, the system may employ Time Division Duplex (TDD), that is, the Remote Radios may transmit and receive over the same PLMR channel frequencies but at different periods of time. In another embodiment of the invention, different PLMR frequencies may be used by the Remote Radios to transmit and receive, but the transmission and reception are carried out in different time periods. In yet another embodiment of the invention, the system may employ Frequency Division Duplex (FDD), that is, the Remote Radios may transmit and receive over different PLMR frequencies at the same time.

A combination of Frequency Division Multiple Access (FDMA) and Time Division Multiple Access (TDMA) schemes may be used to allocate system resources for communication to/from the Remote Radios. In one embodiment of the invention, each Remote Radio is allocated a single PLMR channel for a period of time for communication in the downlink (Base Station to Remote Radio) or uplink (Remote Radio to Base Station) direction. A Base Station may communicate with multiple Remote Radios over different PLMR channels at the same time. In a different embodiment of the invention, a Base Station may allocate multiple PLMR channels to a single Remote Radio for a period of time.

Non-dedicated PLMR channel selection may be undertaken by the system based upon policy rules defined by the user. In one embodiment of the invention, all channel selection and allocation decisions are made at the Base Stations, based upon channel occupancy reports from Remote Radios (that is, based upon Remote Radio scanner measurements) or from scanners embedded in the Base Stations or from stand alone scanners. In another embodiment of the invention, non-dedicated PLMR channel selection and allocation are distributed among all Remote Radios. It should be noted that dedicated PLMR channels are always available and as such, they are not subject to the PLMR channel selection process.

Common control channels may be used by the system to deliver non-dedicated PLMR channel occupancy reports (Remote Radios to Base Station) and for channel allocation (Base Station to Remote Radios). In one embodiment of the invention, the control channels may be allocated a dedicated PLMR channel. In another embodiment of the invention, the control channels may be time multiplexed with data transmission on the same PLMR channels.

The Base Station Central Controller (BSC) may have the following tasks:
 a. Serve as a central data distribution hub for the system. It is connected to the dispatch center and to backhaul links connected to all Base Stations.
 b. Keep track of Remote Radios for packet forwarding, that is, a packet is forwarded to the "home" Base Station of the destination Remote Radio.
 c. Receive non-dedicated PLMR channel occupancy reports and provides channel allocation "guidelines" to the Base Stations.

Remote Radios and Base Stations may employ multiple PLMR transceivers to enable concurrent communication over multiple PLMR channels which may not be adjacent to each other. A high bit rate data stream is converted at the transmitter (at the Base Station or at the Remote Radios) into multiple lower speed bit streams which are transmitted over multiple PLMR channels. In this case, RF transmission characteristics over each PLMR channel are maintained as per the applicable regulations (e.g., PLMR channel spectral mask). The original high bit rate data stream is reconstructed from the multiple low speed bit streams at the receiver (at the Base Stations or Remote Radios).

FIG. 1 illustrates a scenario with two available non-adjacent non-dedicated PLMR channels (channels 1 & 4 are available while channels 2 & 3 are not available). In this case, the system employs non-dedicated PLMR channels 1 and 4, maintaining the RF characteristics of the individual PLMR channels.

When multiple adjacent PLMR channels are available, Remote Radios and Base Stations may combine the individual adjacent PLMR channels into one wider channel. In this case, RF transmission characteristics follow the applicable regulations only at the edges of the wider band. FIGS. 2A and 2B illustrate a scenario with four (4) available adjacent PLMR channel. The system may use a 4-PLMR channel configuration as in FIG. 2A or a single wider channel as shown in FIG. 2B.

The system may employ the following methods in order to avoid blocking voice users from reclaiming a non-dedicated PLMR channel:

- Limit the maximal time that a Remote Radio and the Base Station is allowed to transmit continuously over a non dedicated PLMR channel;
- Secure a minimal time that a non-dedicated PLMR channel is sensed for voice activity before it is declared idle;
- Always maintain one idle non-dedicated PLMR channel in trunked radio systems.

The system may employ the following methods in order to limit the overall TX power transmitted by a Remote Radio:

- Apply Digital Pre-Distortion Equalization (DPD) algorithms. The DPD algorithm introduces pre-distortion at the baseband signal to eliminate interference that is generated throughout the RF section. The distortion at the antenna is measured by comparing the clean baseband signal with a feedback signal from the antenna that is down-converted to baseband frequency. The DPD algorithm is transparent to the shape of the transmitted signal and therefore it can be effectively applied to remove interference from a sum of narrowband signals as described in the present invention. The DPD algorithm facilitates much smaller backoff of the transmit signal than would otherwise be needed.
- The total peak TX power may be limited to be below a Max power level value. The number of PLMR channels that may be used concurrently by a single Remote Radio will be limited, depending on the power level requirement per individual channel (which is determined by the propagation conditions and the modulation level). The limitation on the TX power transmitted by a Remote Radio leverages the typical asymmetric characteristics of data communication between the Dispatch Center and the Remote Terminals. The volume of traffic from Dispatch Center to Remote Terminals is much larger than the volume of traffic from a single Remote Terminals to Dispatch Center.
- Transmission by a Remote Radio over multiple PLMR channels is shifted in time relative to each other in order to minimize concurrent transmission over multiple channels. This method takes advantage of the non-continuous usage of non-dedicated PLMR channels by the Remote Radio since idle non-dedicated PLMR channels are used for a limited period of time before they are released to let voice users regain access to the channel. If no traffic is detected during the monitoring phase, the non-dedicated PLMR channel is reused for data transmission.

There is thus provided a Point to Multipoint (PtMP) wireless communication system between a dispatch center hub and a plurality of remote terminals, in accordance with an embodiment of the present invention. The system includes a base station controller (BSC) in communication with the dispatch center hub, a plurality of base stations in communication with the base station controller, a plurality of remote radios in communication with at least one of the plurality of remote terminals, at least one PLMR channel scanner embedded in each of the plurality of base stations and each of the plurality of remote radios. The PLMR channel scanners scan the PLMR channels to determine which of the PLMR channels is idle at any point of time. Each of the base stations maintains two-way data communication over idle PLMR channels with the plurality of remote radios in its serving area.

Furthermore, in accordance with an embodiment of the invention, the system further includes a plurality of radio relays transceivers in communication with the plurality of base stations. Each of the plurality of radio relays transceivers communicate with the plurality of remote radios.

Furthermore, in accordance with an embodiment of the invention, the idle PLMR channels are non-dedicated PLMR channels. The idle PLMR channels may include a plurality of individual adjacent PLMR channels combined into a single wider channel. Alternatively, the idle PLMR channels may include a plurality of individual non-adjacent PLMR channels.

Furthermore, in accordance with an embodiment of the invention, each of the plurality of base stations may include a RF front end in communication with the PLMR channel scanner embedded in each of the plurality of base stations, a cognitive controller in communication with the RF front end and the at least one PLMR channel scanner and a baseband modem in communication with the RF front end and the cognitive controller.

Furthermore, in accordance with an embodiment of the invention, each of the plurality of base stations further may include a plurality of transmitters in communication with the cognitive controller, each of the plurality of transmitters configured to perform modulation for a single PLMR channel; and a plurality of receivers in communication with the cognitive controller, each of the plurality of receivers configured to perform demodulation for a single PLMR channel.

Furthermore, in accordance with an embodiment of the invention, each of the plurality of base stations further may include an inverse Mux in communication with the cognitive controller, the inverse Mux configured to convert a high bit rate data stream into multiple lower bit rate data streams for delivery to the plurality of transmitters; and a Mux in communication with the cognitive controller. The Mux may be configured to convert multiple lower bit rate data streams received into one high bit rate data stream for delivery to a local user.

Additionally, in accordance with an embodiment of the invention, each of the plurality of remote radios may include a RF front end in communication with the at least one PLMR channel scanner embedded in each of the plurality of remote radios; a remote radio (RR) cognitive controller in communication with the RF front end and the remote radio scanner; and a modem in communication with the RF front end and the RR cognitive controller.

Furthermore, in accordance with an embodiment of the invention, each of the plurality of remote radios may further include a plurality of transmitters in communication with the RR cognitive controller, each of the plurality of transmitters configured to perform modulation for a single PLMR channel; and a plurality of receivers in communication with the RR cognitive controller, each of the plurality of receivers configured to perform demodulation for a single PLMR channel.

Furthermore, in accordance with an embodiment of the invention, the single PLMR channel may include the bandwidth of all the available adjacent PLMR channels.

Furthermore, in accordance with an embodiment of the invention, each of the plurality of remote radios may further include an inverse Mux in communication with the RR cognitive controller, the inverse Mux configured to convert a high bit rate data stream into multiple lower bit rate data streams for delivery to the plurality of transmitters; and a Mux in communication with the RR cognitive controller, the Mux configured to convert multiple lower bit rate data streams received into one high bit rate data stream for delivery to a local user.

Furthermore, in accordance with an embodiment of the invention, the channel width of the PLMR channels is within a range of 6.25 KHz to 50 KHz.

Furthermore, in accordance with an embodiment of the invention, the PLMR channels comprise one of a group of characteristics including a single channel per PLMR channel and two sub-channels separated by a guard band.

Additionally, in accordance with an embodiment of the invention, each of the plurality of base stations may include an Orthogonal frequency-division multiplexing (OFDM)/Orthogonal Frequency Division Multiple Access (OFDMA) transmitter configured to transmit a multiple carrier waveform over adjacent or non adjacent PLMR channels and an OFDM/OFDMA receiver configured to receive the OFDM/OFDMA waveform generated by the remote OFDM/OFDMA transmitter over adjacent or non adjacent PLMR channels; a RF front end in communication with the OFDM/OFDMA receiver, an OFDM/OFDMA transmitter and at least one PLMR channel scanner embedded in each of the plurality of base stations; and a cognitive MAC controller in communication with the at least one PLMR channel scanner embedded in each of the plurality of base stations, the OFDM/OFDMA receiver and OFDM/OFDMA transmitter. The cognitive controller may be configured to allocate non-dedicated PLMR channel resources based upon scanner reports plus allocation of dedicated PLMR channels if available.

Furthermore, in accordance with an embodiment of the invention, the RF front end may include a Receive Notch Filter Bank (RNFB) configured to block signals received over non usable portions of the channel and over non idle non-dedicated PLMR channels; and a Digital Pre-Distortion Equalizer (DPD) configured to eliminate products of the transmit signal to be transmitted over non usable portions of the channel and over non idle non-dedicated PLMR channels. The Receive Notch Filter Bank may be programmable and controlled by the cognitive MAC controller.

Furthermore, in accordance with an embodiment of the invention, the OFDM/OFDMA transmitter is configured to transmit a multiple carrier waveform over a single or multiple adjacent or non adjacent PLMR channels with non usable portions, dedicated PLMR channels and non-dedicated PLMR channels.

Furthermore, in accordance with an embodiment of the invention, the cognitive MAC controller may be configured to control frequency allocations for all remote radios with which it communicates.

Additionally, in accordance with an embodiment of the invention, each of the plurality of remote radios may include an Orthogonal frequency-division multiplexing (OFDM)/Orthogonal Frequency Division Multiple Access (OFDMA) transmitter configured to transmit a multiple carrier waveform over a single or multiple adjacent or non adjacent PLMR channels; an OFDM/OFDMA receiver configured to receive the OFDM/OFDMA waveform generated by the remote OFDM/OFDMA transmitter over a single or multiple adjacent or non adjacent PLMR channels; a RF front end in communication with the OFDM/OFDMA receiver, the OFDM/OFDMA transmitter and at least one PLMR channel scanner embedded in each of the plurality of remote radios; and a cognitive MAC controller in communication with the base station scanner, the OFDM/OFDMA receiver and the OFDM/OFDMA transmitter. The cognitive controller may be configured to allocate non-dedicated PLMR channel resources based upon scanner reports and dedicated PLMR channels if available.

Furthermore, in accordance with an embodiment of the invention, the cognitive MAC controller may be configured to control local operational parameters of the remote radio.

Furthermore, in accordance with an embodiment of the invention, the OFDM/OFDMA transmitter may be configured to transmit a multiple carrier waveform over a single or multiple adjacent or non adjacent PLMR channels with non usable portions, dedicated PLMR channels and non-dedicated PLMR channels.

Furthermore, in accordance with an embodiment of the invention, the PLMR scanner includes a detector, the detector configured to perform one of a group of operations including comparing the power level at each PLMR channel against a threshold level; detecting a Continuous Tone Coded Squelch System (CTCSS) within the PLMR channel; detecting a Digital Code Squelch (DCS) signal within a PLMR channel and detecting channel allocation control messages over a control channel of a trunked radio system.

Additionally, there is also provided a method for the delivery of high speed data services. The method includes the steps of:

scanning private land mobile radio (PLMR) channels;

determining which of the PLMR channels are idle at any point of time; and allocating at least one of the idle PLMR channels for data communication.

Furthermore, in accordance with an embodiment of the invention, the idle PLMR channel is a non-dedicated PLMR channel, and the step of determining includes at least one of the steps of:

comparing the power level at each PLMR channel against a threshold level;

detecting a Continuous Tone Coded Squelch System (CTCSS) within the PLMR channel;

detecting a Digital Code Squelch (DCS) signal within a PLMR channel; and detecting channel allocation control messages over a control channel of a trunked radio system.

Furthermore, in accordance with an embodiment of the invention, the idle PLMR channel is a non-dedicated PLMR channel, and the step of allocating includes the step of:

combining individual adjacent PLMR channels into a single wider channel.

Furthermore, in accordance with an embodiment of the invention, the idle PLMR channel is a non-dedicated PLMR channel, and the step of allocating includes the steps of:

limiting the period of time for data transmission; and releasing the PLMR channel for a period of time thereby allowing voice users to regain access to the non-dedicated PLMR channel.

Furthermore, in accordance with an embodiment of the invention, at least one of the idle PLMR channels is used in each of a plurality of base stations and wherein at least one of the idle PLMR channels is used in each of a plurality of remote radios and further includes the step of:

each of the plurality of base stations maintaining a two-way data communication over at least one of the idle PLMR channels with each of the plurality of remote radios in its serving area.

Furthermore, in accordance with an embodiment of the invention, the method further includes the step of:

limiting the overall transmission power transmitted by each of the plurality of remote radios.

The step of limiting may include at least one of the steps of:
applying pre-distortion to the baseband signal to eliminate interference that is generated throughout the RF section;
limiting the total peak TX power below a pre-determined Max power level value;
limiting the number of PLMR channels that may be concurrently used by each of the plurality of remote radios; and
shifting transmission by each of the plurality of remote radios over multiple non-dedicated PLMR channels in time relative to each other of the plurality of remote radios.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

The present invention relates to a PLMR system that provides bi-directional Point-to-Multipoint (PtMP) data communication between a dispatch center and many fixed or mobile remote terminals (RTs).

Figure 1:
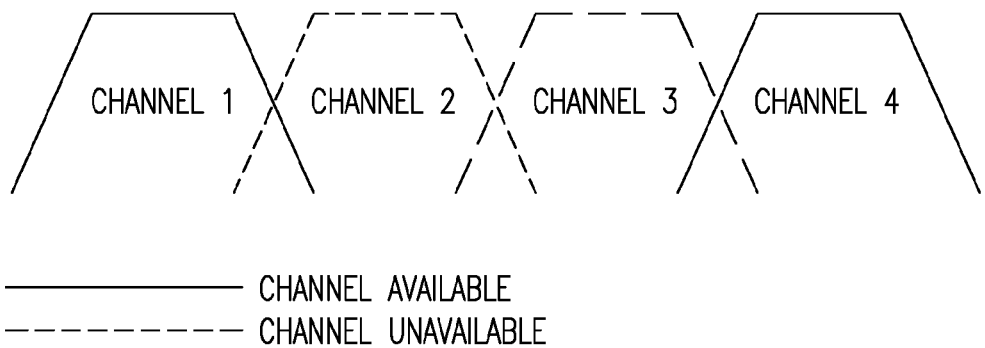
FIG. 1 is a schematic illustration of two available non-adjacent non-dedicated PLMR channels.
Figure 2A:
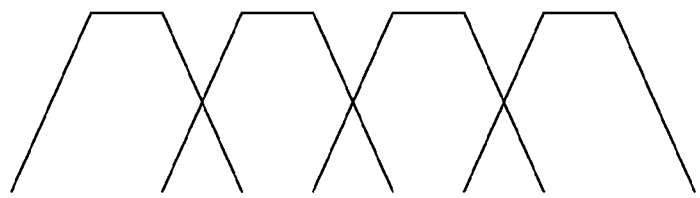
FIGS. 2A and 2B schematic illustrations showing four available adjacent PLMR channel.
Figure 2B:

Reference is now made to FIG. 2, which is a schematic illustration of a of an IEEE802.16-e based, PtMP wireless system, generally designated 10, operating over licensed bands below 1 GHz, according to an embodiment of the present invention. The system 10 comprises a Dispatch Center Hub 12 in communication with a base station controller (BSC) 14 which serves as the system's central data hub and controller. Dispatch center hub 12 communicates with mobile or fixed remote terminals, generally designated 22.

The BSC 14 is in communication with a plurality of Base Stations (BS), generally designated 16 located at PLMR tower sites. For clarity, only two base stations (16a, 16b) are shown in the FIG. 3, but the system 10 may comprise a multiplicity of base stations. Base stations 16a and 16b are connected to the BSC 14 via backhaul connections 18a and 18b, respectively. Each of these backhaul connections may be a bi-directional PtP wire line or wireless communication facility. Generally, each base station transmits and receives an RF signal using its local tower. Typically, the base station 16 may be installed indoors and its antenna (17a, 17b) may be installed on the tower. Alternatively, the entire base station 16 and the antenna may be installed on the tower to avoid cable attenuation.

Figure 3:
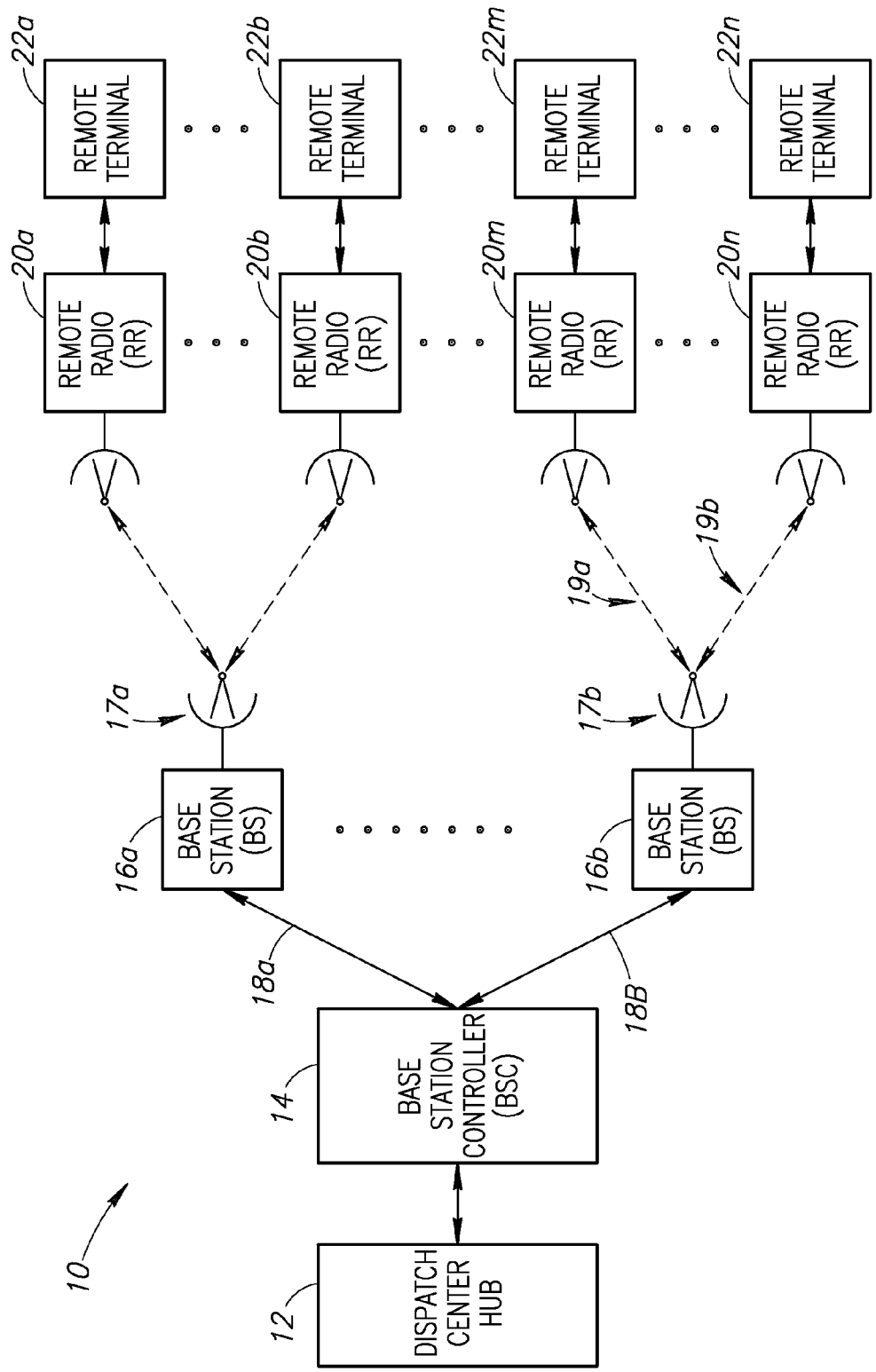
FIG. 3 is a schematic illustration of a PtMP wireless system operating over PLMR channels, according to an embodiment of the present invention.

The Base Station 16 communicates with all fixed and mobile remote radios (RRs) (generally designated 20, individually designated 20a, 20b ... 20m, 20n) in its serving area. For example, base station 16a communicates with Remote Radios 20a and 20b (indicated by dashed lines 15a, 15b) while base station 16b communicates with Remote Radio 20m and 20n (indicated by dashed lines 19a, 19b), as shown in FIG. 3. It will be appreciated that each base station may communicate with a multiplicity of remote radios. Each Remote Radio 20 may be connected to its own local remote terminal (RT) 22. For example, remote radio 20a may be connected to its own local remote terminal 22a and remote radio 20n may be connected to local remote terminal 22n.

Figure 4:
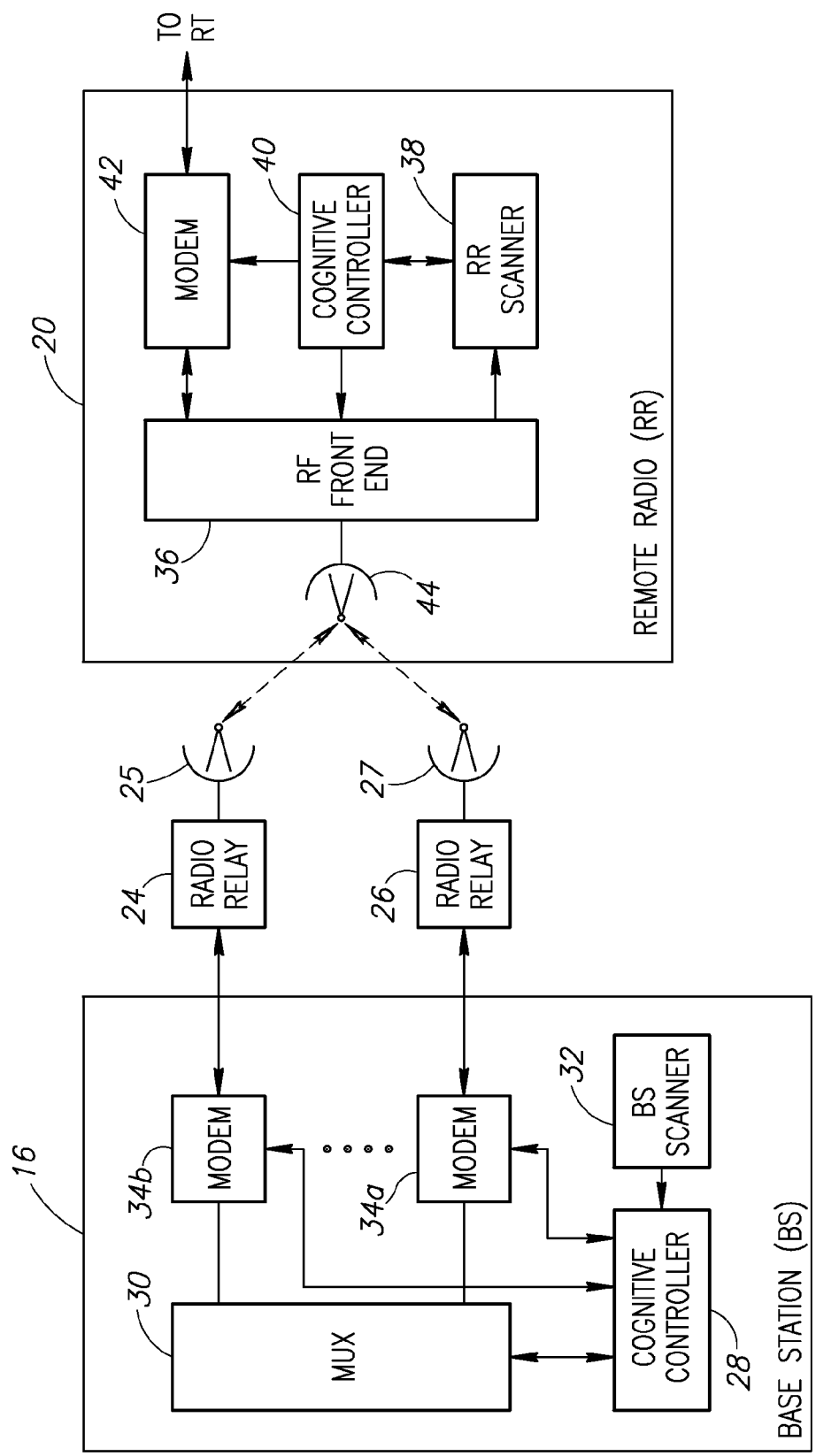
FIG. 4 is a schematic illustration of the two-way link between a Base Station (Base Station) and remote radios (Remote Radio) used with the PtMP wireless system of FIG. 3 communicating through radio relays.

Reference is now made to FIG. 4 which is a detailed schematic illustration of the two-way link between a Base Station 16 and a Remote Radio 20. The two way link may be established between Base Station 16 and Remote Radio 20 via radio relays 24 and 26. The innovation of the present invention, which allows two-way high speed data communication over dedicated and non-dedicated PLMR channels and infrastructure owned and operated by the customer, will now be described.

Radio relays 24 and 26 may be radio relay transceivers, which are part of the existing PLMR infrastructure, or alternatively, new radio relays dedicated to the data overlay system. Radio relays 24 and 26 may support communication within a single PLMR cell. Each of the Radio relays 24, 26 may support operation over a single PLMR channel. Base Station 16 may be connected to multiple radio relays in the local tower site.

Base Station 16 comprises a cognitive controller 28 in communication with a multiplexer 30, a scanner 32 and a plurality of modems 34a, 34b. The multiplexer 30 is also in communication with plurality of modems 34a, 34b.

Remote Radio 20 comprises a RF front end 36 in communication with a remote radio scanner 38, a second cognitive controller 40 and a second modem 42. Second cognitive controller 40 is also in communication with second modem 42 and remote radio scanner 38.

The cognitive controller 28 determines the non-dedicated PLMR channel allocation for data communication, based upon non-dedicated PLMR channel voice occupancy reports, offered traffic load and policy rules.

The cognitive controller 28 may receive non-dedicated PLMR channel occupancy reports from either BS scanner 32 and/or from the remote radio scanner 38 of remote radio 20. The cognitive controller 28 also receives offered traffic load reports from Mux 30 and from Remote Radio 20 over a control channel. The channel occupancy report indicates the occupancy status (i.e., free or occupied) of all channels which are operated within the respective BS cell. The traffic load report indicates downlink and uplink traffic for which channel resources are required. Both channel occupancy reports and offered traffic report are sent from remote radio 20 to cognitive controller 28 over a dedicated or non dedicated control channel.

The cognitive controller 28 makes channel allocation decisions and controls operational parameters of the BS modems 34a and 34b (and any additional modems, not shown in the figure), Remote Radio 20, BS scanner 32 and remote radio scanner 38 through configurable policy rules.

Non-limiting examples of rules supported by the cognitive controller 28 with respect to the usage of non-dedicated PLMR channels are as follows:

Maximum number of dedicated and non-dedicated PLMR channels that can be used concurrently by the Remote Radio 20;

Maximum power level transmitted by a Remote Radio 20 over a single dedicated and non-dedicated PLMR channel;

Maximum power level transmitted by a remote Radio 20 over multiple dedicated and non-dedicated PLMR channels;

Maximum period of continuous transmission over a dedicated and non-dedicated PLMR channel;

Minimum sense time before a non-dedicated PLMR channel can be used;

The list of non-dedicated PLMR channels to be scanned by BS scanner 32 and by remote radio scanner 38;

Type of detection during scanning for non-dedicated PLMR channels (i.e., compare power level within non-dedicated PLMR channel against threshold, detecting CTCSS or DCS signal, monitoring P25 trunked radio control channel messages, monitoring TETRA trunked radio control channel, or monitoring proprietary trunked radio control channel).

The base station architecture in FIG. 4 includes Mux 30, which is used to split the high speed bit stream received from the base station controller (BSC) into multiple low speed bit streams delivered to modems 34a and 34b. In the other direction, multiple low speed bit streams received by Mux 30 from modems 34a and 34b, are combined into a high speed bit stream delivered to the BSC.

In FIG. 4, radio relays 24 and 26 may transmit and receive (via antennas 25 and 27, respectively) over two distinct frequencies (i.e., the PLMR channel consists of two sub-channels with a guard band) at the same time—this is a typical trunked radio operation. Alternatively, radio relays 24 and 26 may transmit and receive over the same frequency but not at the same time—a typical conventional radio system operation.

Remote Radio 20 consists of a RF front end 36 employing Time Division Duplex (TDD) or Half Duplex Frequency Division Duplex (HD-FDD) so that transmit and receive may not take place concurrently. A single antenna 44 at the Remote Radio 20 may typically be is used both to transmit and to receive. The remote radio cognitive controller 40, which controls operational parameters of the Remote Radio 20, may communicate with the BS cognitive controller 28 for scanning and reporting of non-dedicated PLMR channel occupancy, for non dedicated PLMR channel allocation and for setup of Remote Radio operational parameters, for example.

Figure 5:
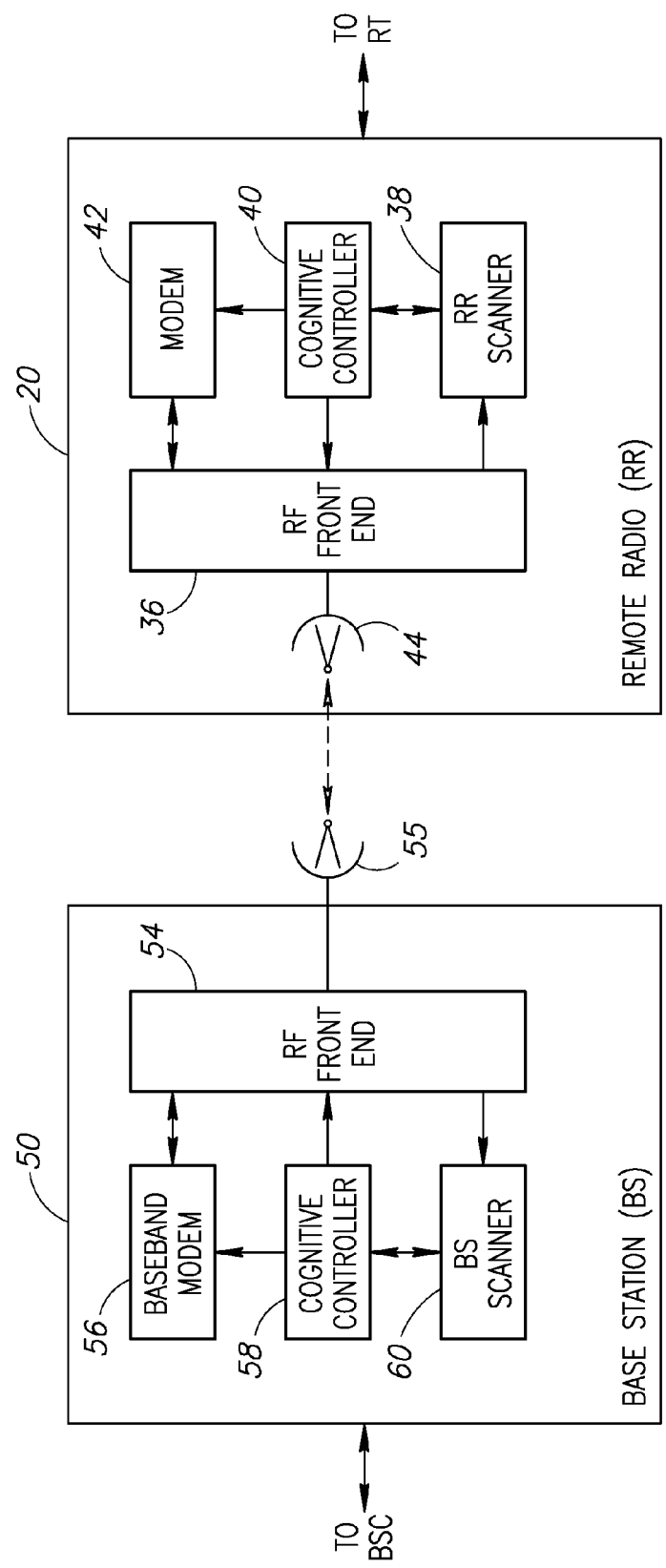
FIG. 5 is a further schematic illustration of a single Base Stations (BS) used with the PtMP wireless system of FIG. 3, communicating with a single Remote Radio (Remote Radio) having its own RF front end.

Reference is now made to FIG. 5 which is a schematic illustration of a single Base Stations (BS) used with the PtMP wireless system of FIG. 3, communicating with a single Remote Radio (RR) having its own RF front end.

FIG. 5 shows in greater detail how a two-way link may be established between a Base Station 50 and Remote Radio 20. In this scenario, the radio relays are not used. Instead, Base Station 50 employs its own RF front end 54 and a single baseband modem 56. This innovation allows two-way high speed data communication, via antenna 55, over dedicated and non-dedicated PLMR channels owned by the customer. Base Station 50 also comprises a cognitive controller 58 in two-way communication with baseband modem 56 and in communication with a BS scanner 60 and the RF front end 54.

A cognitive controller 58 at Base Station 50 determines non-dedicated PLMR channel allocation for data communication, based upon non-dedicated PLMR channel voice occupancy reports, offered traffic load and policy rules.

The cognitive controller 58 receives non-dedicated PLMR channel occupancy reports from base station scanner 60 and/or from remote radio scanner 38. The cognitive controller 58 also receives offered traffic load report from baseband modem 56 and from Remote Radio 20 over a control channel. The cognitive controller 28 may receive non-dedicated PLMR channel occupancy reports from either BS scanner 32 and/or from the remote radio scanner 38 of remote radio 20. The cognitive controller 28 also receives offered traffic load reports from Mux 30 and from Remote Radio 20 over a control channel. The channel occupancy report indicates the occupancy status (i.e., free or occupied) of all channels which are operated within the respective BS cell. The traffic load report indicates downlink and uplink traffic for which channel resources are required. Both channel occupancy reports and offered traffic report are sent from remote radio 20 to cognitive controller 28 over a dedicated or non dedicated control channel.

The cognitive controller 58 makes channel allocation decisions and controls operational parameters of the baseband modem 56, Remote Radio 20, BS scanner 60 and remote radio scanner 38 through configurable policy rules.

Non-limiting examples of rules supported by the cognitive controller 58 with respect to the usage of non-dedicated PLMR channels are as follows:

Maximum number of dedicated and non-dedicated PLMR channels that can be used concurrently by the Remote Radio 20;

Maximum power level transmitted by a Remote Radio 20 over a single dedicated and non-dedicated PLMR channel;

Maximum power level transmitted by a remote Radio 20 over multiple dedicated and non-dedicated PLMR channels;

Maximum period of continuous transmission over a dedicated and non-dedicated PLMR channel;

Minimum sense time before a non-dedicated PLMR channel can be used;

The list of non-dedicated PLMR channels to be scanned by BS scanner 60 and by remote radio scanner 38;

Type of detection during scanning for non-dedicated PLMR channels (i.e., compare power level within non-dedicated PLMR channel against threshold, detecting CTCSS or DCS signal, monitoring P25 trunked radio control channel messages, monitoring TETRA trunked radio control channel, or monitoring proprietary trunked radio control channel).

The baseband modem 56 of FIG. 5 may transmit and receive over multiple dedicated and non-dedicated PLMR channels.

The Remote Radio 20, previously described with reference to FIG. 4 consists of an RF front end 36 employing Time Division Duplex (TDD) or Half Duplex Frequency Division Duplex (HD-FDD) so that transmit and receive may not take place concurrently.

Figure 6:
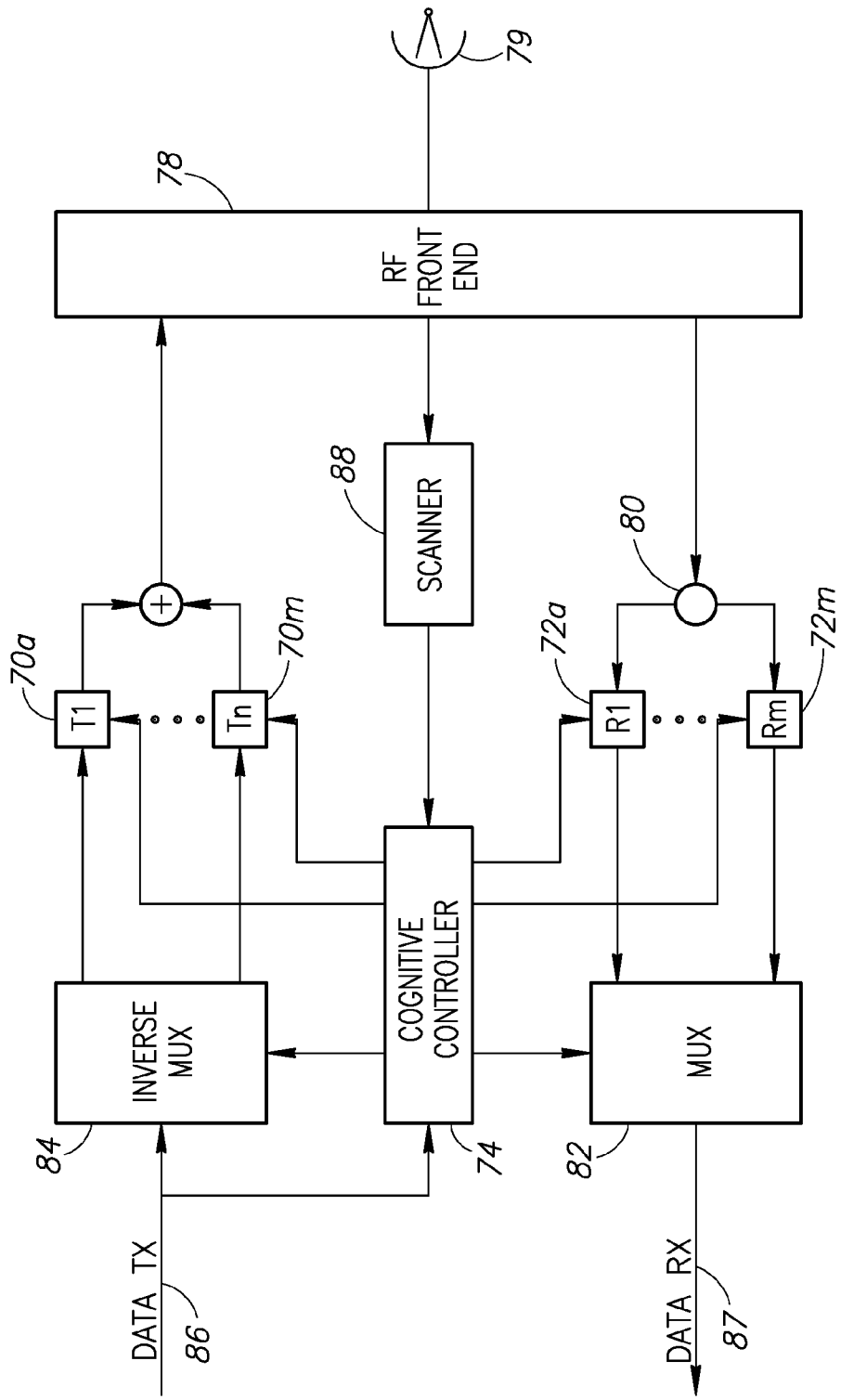
FIG. 6 is a schematic block diagram illustration of the Remote Radio (Remote Radio) circuitry of the base station of FIG. 1.

Reference is now made to FIG. 6, which describes the architecture of the Base Station 16 and the Remote Radio 20, which were described hereinabove with reference to FIG. 3. At the center of this architecture are n transmitters, $T_1$ to $T_n$, (referenced 70a to 70n) and m receivers $R_1$ to $R_m$ (referenced 72a to 72m) in communication with a cognitive controller 74. Each transmitter may perform modulation for a single PLMR channel. The signals generated by all modulators may be combined by a combiner 76 and delivered to the RF front end 78. In the receive direction, the signal received from the RF front end 78 may be split by a splitter 80 and delivered to receivers $R_1$ to $R_m$. Each receiver may perform demodulation for a single PLMR channel. $R_1$ to $R_m$ may also contain individual PLMR channel filtering circuitry to meet adjacent PLMR channel interference requirements.

The cognitive controller 74 is also in communication with a Mux 82 and an inverse Mux 84. The inverse Mux 84 receives a high bit rate TX data stream 86 from the end user (remote terminal or dispatch center) and splits it into multiple lower speed TX data streams delivered to transmitters $T_1$ to $T_n$ (70a to 70n).

In the receive direction, low speed RX data streams 87 received from receivers $R_1$ to $R_m$ (72a to 72m) may be multiplexed by the Mux which reconstructs the high speed data stream that was originally transmitted by the remote user (the dispatch center or the remote terminal).

The RF front end 78 may consist of up/down conversion, power amplifier and LNA. It may cover all the sub 1 GHz PLMR frequency bands. Two-way high speed data communication is carried out via antenna 79.

A scanner 88, in communication with cognitive controller 74 and RF front end 78, may scan voice occupancy of local non-dedicated PLMR channels which may be reported to the cognitive controller 74.

The cognitive controller 74 controls the operational parameters of transmitters $T_1$ to $T_n$, receivers $R_1$ to $R_m$, Inverse Mux 84, Mux 82 and RF front end 78, based upon the scanner occupancy report, offered load from the user (remote terminal or dispatch center) and controls messages received from the base station cognitive controller. It should be noted that the scanner occupancy reports are only used for the allocation of non-dedicated PLMR channels since dedicated PLMR channels are always available for the broadband data service.

Figure 7:
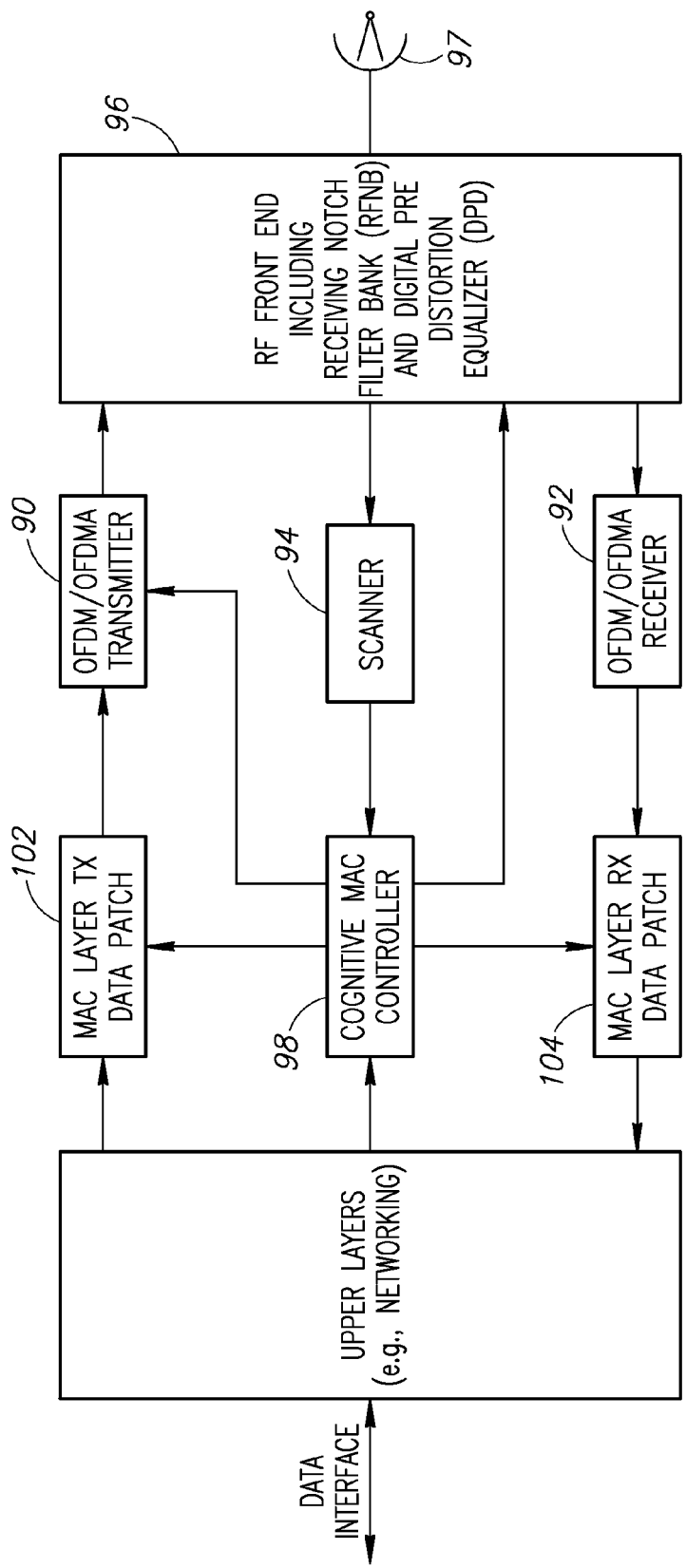
FIG. 7 is a schematic block diagram illustration of OFDM/OFDMA based architecture.

Reference is now made to FIG. 7 which describes an alternative embodiment of the present invention, in which the architecture of Base Station 16 and Remote Radio 20 are based on the Orthogonal Frequency-Division Multiplexing (OFDM)/Orthogonal Frequency Division Multiple Access (OFDMA) PHY (physical layers) technology.

In this embodiment, the OFDM/OFDMA transmitter 90 and the OFDM/OFDMA receiver 92 replace the n transmitters and the m receivers, respectively, shown in the embodiment of FIG. 6. The embodiment of FIG. 7 leverages the OFDM/OFDMA multi-carrier waveform which is used to transmit over multiple PLMR channels that may be adjacent or non adjacent to each other so that only a single transmitter and a single receiver are needed. As a result, this implementation does not require a Mux and an Inverse Mux. The OFDM/OFDMA channel spans the entire frequency range that is being used by the radio including dedicated PLMR channels, non dedicated PLMR channels and portions of the channel that may be defined as non usable. Operations within each dedicated and non dedicated PLMR channels are carried out using OFDM/OFDMA sub-channels. Each sub-channel is a group of sub-carriers which are a subset of the total sub-carrier population.

A scanner 94, in communication with the RF front end 96 and a cognitive Media Access Controller (MAC) 98, may generate PLMR voice usage reports with respect to the local non-dedicated PLMR channels. These reports may be delivered locally to the cognitive MAC controller 98 at the Remote Radio and at the Base Station. The remote radio cognitive MAC controller 98 may also deliver the local scanner report to the cognitive MAC controller at the Base Station. The cognitive MAC controller 98 performs different roles at the Base Station 16 and at the Remote Radio 20; the cognitive MAC controller at the Base Station 16 controls frequency allocations for all remote radios with which it communicates, while the cognitive MAC controller at the Remote Radio 20 only controls local operational parameters of the Remote Radio.

The RF front end 96 may comprise up/down conversion, power amplifier, LNA, a Digital Pre-Distortion Equalizer (DPD) and a Receiver Notch Filter Bank (RNFB). Two-way high speed data communication is carried out via antenna 97. The RFNB may be configured to permanently remove/attenuate power received over non-usable portions of the channel. In addition, notch filters are tuned to the frequency of non-dedicated PLMR channels when they carry voice to remove/attenuate power received over these channels as long as they are not available for the broadband data service. The tuning and activation of notch filters to block non-dedicated PLMR channels is controlled by the cognitive MAC controller 98. The notch filtering of non-usable portions of the channel and of non idle non-dedicated PLMR channel is needed to maintain orthogonally of the OFDM/OFDMA waveform. In the transmit direction, the DPD may be used to minimize the power transmitted over the non usable portions of the channel and on the non idle non-dedicated channels.

The scanner 94 scans voice occupancy of local non-dedicated PLMR channels which are reported to the cognitive MAC controller 98.

The cognitive MAC controller 98 controls the operational parameters of OFDM/OFDMA transmitter 90, MAC layer TX data path 102, the Receiver Notch Filter Bank (RNFB) at the RF front end 96, the OFDM/OFDMA receiver 92 and the MAC layer RX data path 104. The cognitive MAC controller operation is based on local and remote scanner occupancy reports and on the offered load at the data interface. It should be noted that scanner occupancy reports are only used for the allocation of non-dedicated PLMR channels, since dedicated PLMR channels are always available for the broadband data service.

Figure 8:
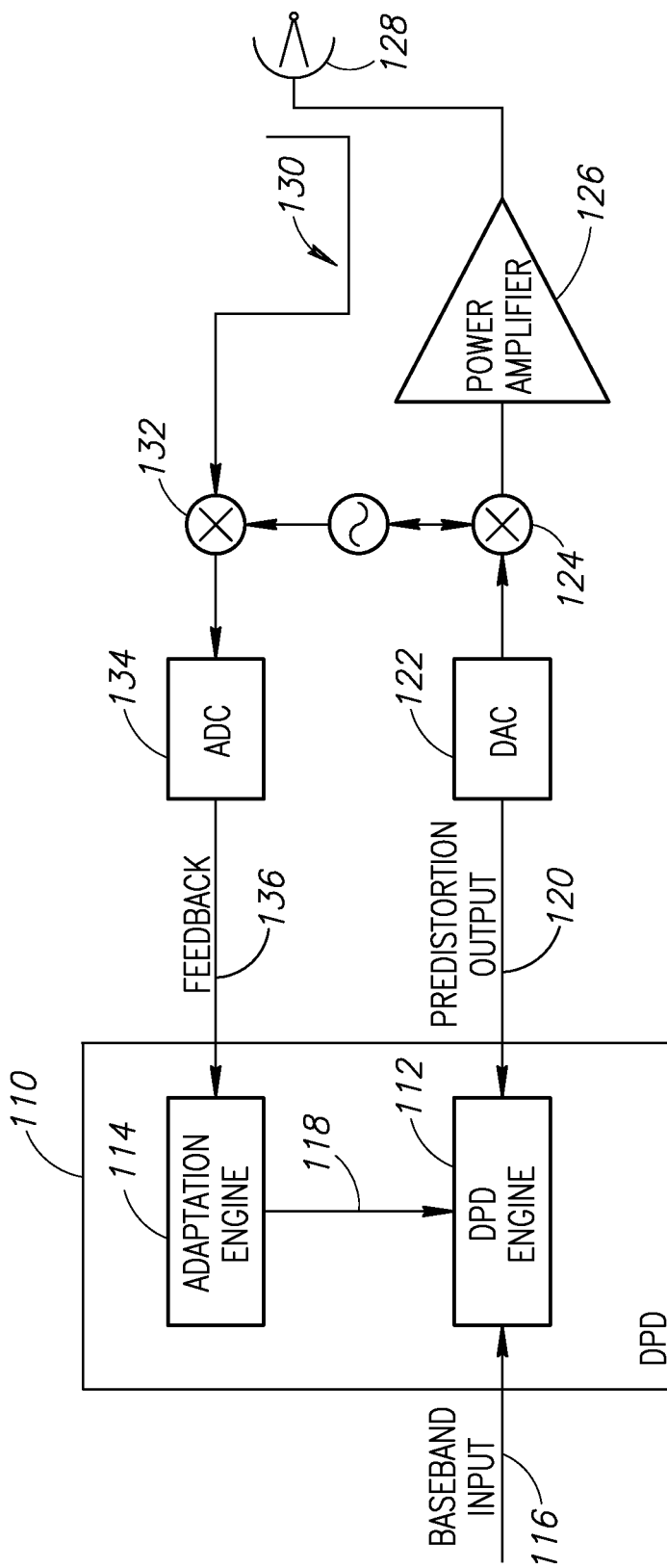
FIG. 8 is a schematic block diagram illustration of a pre-distortion equalizer used at the Base Station (BS).

Reference is now made to FIG. 8 which is a schematic block diagram illustration of a pre-distortion equalizer (DPD), generally referenced 110, which may be used at the Base Station 16 and at the Remote Radio 20. The pre-distortion equalizer (DPD) 110 comprises a DPD Engine 112 in communication with an adaptation engine 114. The DPD Engine 112, which is at the center of the architecture, compares the clean baseband signal 116 with the distorted feedback signal received from antenna 118 and generates a pre-distorted output signal 120 which is fed to the transmit chain. The transmit chain comprises a Digital to Analog Converter (DAC) 122, frequency up converter mixer 124, Power Amplifier 126 and an antenna 128. The signal transmitted at the antenna 128 is returned to the RX path 130 via down converter mixer 132 and Analog to Digital Converter (ADC) 134. The feedback signal 136 is fed into the adaptation engine 114, which removes components of the feedback signal, such as interference signals from other radios, for example, that need to be excluded from comparison by the DPD engine. It should be noted that the DPD circuit takes advantage of the Time Division Duplex mode of operation of the system. Since the system does not transmit and receive at the same time, the feedback receive path may be used during the transmission phase.

It will be appreciated that the present invention is not limited by what has been described hereinabove and that numerous modifications, all of which fall within the scope of the present invention, exist.

Rather the scope of the invention is defined by the claims, which follow:

The invention claimed is:

1. A point to multipoint wireless system for communication between a dispatch center hub and a plurality of remote terminals, the system comprising:
    a base station controller in communication with the dispatch center hub;
    a plurality of base stations, each of said plurality of base stations in communication with the base station controller, each of said plurality of base stations being located at a corresponding one of a plurality of private land mobile radio (PLMR) tower sites;
    a plurality of remote radios in communication with at least one of said plurality of remote terminals;
    at least one PLMR channel scanner embedded in each of said plurality of base stations;
    at least one PLMR channel scanner embedded in each of said plurality of remote radios,
    wherein each of said at least one PLMR channel scanners embedded in each of said plurality of base stations and remote radios is configured to scan the PLMR channels to determine which of the PLMR channels is idle at any point of time; and
    wherein each of said plurality of base stations maintains two-way data communication over idle PLMR channels with the plurality of remote radios in its serving area;
    wherein each of said plurality of base stations comprises:
        a Radio Frequency (RF) front end in communication with said at least one PLMR channel scanner embedded in each of said plurality of base stations;
        a cognitive controller in communication with the RF front end and said at least one PLMR channel scanner;
        a baseband modem in communication with the RF front end and said cognitive controller;
        a plurality of transmitters in communication with said cognitive controller, each of the plurality of transmitters configured to perform modulation for a single PLMR channel;
        a plurality of receivers in communication with said cognitive controller, each of the plurality of receivers configured to perform demodulation for a single PLMR channel;
        an inverse multiplexer in communication with said cognitive controller, said inverse multiplexer configured to convert a high bit rate data stream into multiple lower bit rate data streams for delivery to said plurality of transmitters; and
        a multiplexer in communication with said cognitive controller, said configured to convert multiple lower bit rate data streams received into one high bit rate data stream for delivery to a local user;
    wherein each of said plurality of remote radios comprises a remote radio (RR) cognitive controller; and
    wherein said cognitive controller determines the idle PLMR channel allocation for said two-way data communication based upon channel occupancy reports generated by and received from said RR cognitive controller of at least one of said plurality of remote radios.

2. The system according to claim 1, further comprising a plurality of radio relays transceivers in communication with said plurality of base stations and wherein each of said plurality of radio relays transceivers communicate with said plurality of remote radios.

3. The system according to claim 1, wherein said idle PLMR channels are non-dedicated PLMR channels.

4. The system according to claim 3, wherein said idle PLMR channels comprise a plurality of individual adjacent PLMR channels combined into a single wider channel.

5. The system according to claim 3, wherein said idle PLMR channels comprise a plurality of individual non-adjacent PLMR channels.

6. The system according to claim 1, wherein said single PLMR channel comprises the bandwidth of all the available adjacent PLMR channels.

7. The system according to claim 1, wherein the channel width of said PLMR channels is within a range of 6.25 KHz to 50 KHz.

8. The system according to claim 1, wherein said PLMR channels comprise one of a group of characteristics including a single channel per PLMR channel and two sub-channels separated by a guard band.

9. The system according to claim 1, wherein
    each of said plurality of transmitters comprise an Orthogonal frequency-division multiplexing (OFDM)/Orthogonal Frequency Division Multiple Access (OFDMA) transmitter configured to transmit a multiple carrier waveform over adjacent or non adjacent PLMR channels and each of said plurality of receivers comprise an OFDM/OFDMA receiver configured to receive the OFDM/OFDMA waveform generated by a remote OFDM/OFDMA transmitter over adjacent or non adjacent PLMR channels;
    wherein said Radio Frequency (RF) front end in communication with one of the OFDM/OFDMA receivers, and one of the OFDM/OFDMA transmitters; and
    wherein said cognitive controller is a cognitive media access controller (MAC) in communication with said at least one PLMR channel scanner embedded in each of said plurality of base stations, said one of the OFDM/OFDMA receivers and said one of the OFDM/OFDMA transmitters,
    and configured to allocate non-dedicated PLMR channel resources based upon the channel occupancy reports.

10. The system according to claim 9, wherein said Radio Frequency (RF) front end comprises:
    a Receive Notch Filter Bank (RNFB) configured to block signals received over non usable portions of the channel and over non idle non-dedicated PLMR channels; and
    a Digital Pre-Distortion Equalizer (DPD) configured to eliminate products of the transmit signal to be transmitted over non usable portions of the channel and over non idle non-dedicated PLMR channels.

11. The system according to claim 10, wherein said Receive Notch Filter Bank is programmable and controlled by said cognitive controller.

12. The system according to claim 9, wherein said cognitive controller is configured to control frequency allocations for all remote radios with which it communicates.

13. The system according to claim 1, wherein each of said plurality of remote radios further comprises:
    an Orthogonal frequency-division multiplexing (OFDM)/Orthogonal Frequency Division Multiple Access (OFDMA) transmitter configured to transmit a multiple carrier waveform over a single or multiple adjacent or non adjacent PLMR channels;
    an OFDM/OFDMA receiver configured to receive the OFDM/OFDMA waveform generated by the remote OFDM/OFDMA transmitter over a single or multiple adjacent or non adjacent PLMR channels;
    a remote radio (RR) Radio Frequency (RF) front end in communication with the OFDM/OFDMA receiver, the OFDM/OFDMA transmitter and at least one PLMR channel scanner embedded in each of said plurality of remote radios; and wherein said RR cognitive controller is a cognitive media access controller (MAC) in communication with said at least one PLMR channel scanner embedded in each of said plurality of remote radios, said OFDM/OFDMA receiver and OFDM/OFDMA transmitter, said RR cognitive controller being configured to allocate non-dedicated PLMR channel resources based upon channel occupancy reports generated by and received from said cognitive controller.

14. The system according to claim 13, wherein said RR Radio Frequency (RF) front end comprises:

a Receive Notch Filter Bank (RNFB) configured to block signals received over non usable portions of the channel and over non idle non-dedicated PLMR channels;

and a Digital Pre-Distortion Equalizer (DPD) configured to eliminate products of the transmit signal to be transmitted over non usable portions of the channel and over non idle non-dedicated PLMR channels.

15. The system according to claim 14, wherein said Receive Notch Filter Bank is programmable and controlled by said RR cognitive controller.

16. The system according to claim 13, wherein said RR cognitive controller is configured to only control local operational parameters of the remote radio.

17. The system according to claim 9, wherein said OFDM/OFDMA transmitter is configured to transmit a multiple carrier waveform over a single or multiple adjacent or non adjacent PLMR channels with non usable portions, dedicated PLMR channels and non-dedicated PLMR channels.

18. The system according to claim 1, wherein said at least one PLMR scanner comprises a detector, said detector configured to perform one of a group of operations including comparing the power level at each PLMR channel against a threshold level; detecting a Continuous Tone Coded Squelch System (CTCSS) within the PLMR channel; detecting a Digital Code Squelch (DCS) signal within a PLMR channel and detecting channel allocation control messages over a control channel of a trunked radio system.

19. A point to multipoint wireless system for communication between a dispatch center hub and a plurality of remote terminals, the system comprising:

a base station controller in communication with the dispatch center hub;

a plurality of base stations, each of said plurality of base stations in communication with the base station controller, each of said plurality of base stations being located at a corresponding one of a plurality of private land mobile radio (PLMR) tower sites;

a plurality of remote radios in communication with at least one of said plurality of remote terminals;

at least one PLMR channel scanner embedded in each of said plurality of base stations;

at least one PLMR channel scanner embedded in each of said plurality of remote radios, wherein each of said at least one PLMR channel scanners embedded in each of said plurality of base stations and remote radios is configured to scan the PLMR channels to determine which of the PLMR channels is idle at any point of time; and wherein each of said plurality of base stations maintains two-way data communication over idle PLMR channels with the plurality of remote radios in its serving area;

wherein each of said plurality of remote radios comprises:

a Radio Frequency (RF) front end in communication with said at least one PLMR channel scanner embedded in each of said plurality of remote radios;

a remote radio (RR) cognitive controller in communication with the RF front end and the remote radio scanner;

a modem in communication with the RF front end and said RR cognitive controller;

a plurality of transmitters in communication with said RR cognitive controller, each of the plurality of transmitters configured to perform modulation for a single PLMR channel;

a plurality of receivers in communication with said RR cognitive controller, each of the plurality of receivers configured to perform demodulation for a single PLMR channel;

an inverse multiplexer in communication with said RR cognitive controller, said inverse multiplexer configured to convert a high bit rate data stream into multiple lower bit rate data streams for delivery to said plurality of transmitters; and a multiplexer in communication with said RR cognitive controller, said multiplexer configured to convert multiple lower bit rate data streams received into one high bit rate data stream for delivery to a local user;

wherein each of said plurality of base stations comprises a cognitive controller; and wherein said cognitive controller determines the idle PLMR channel allocation for said two-way data communication based upon channel occupancy reports generated by and received from said RR cognitive controller of at least one of said plurality of remote radios.

* * * * *